(12) United States Patent
Sobel et al.

(10) Patent No.: US 6,731,822 B1
(45) Date of Patent: May 4, 2004

(54) METHOD AND APPARATUS FOR FILTERING IMAGES HAVING INSUFFICIENT TONAL PRECISION

(75) Inventors: Irwin Sobel, Menlo Park, CA (US); Ronny Kimmel, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/429,245

(22) Filed: Oct. 28, 1999

(51) Int. Cl.[7] .............................. G06T 5/00; G06K 9/40
(52) U.S. Cl. .................... 382/264; 358/447; 382/251; 382/300
(58) Field of Search ............................. 382/100, 176, 382/269, 260–264, 254, 274, 275, 251; 345/505, 722, 419, 427, 443; 358/1.9, 448, 3.14, 520, 447

(56) References Cited

U.S. PATENT DOCUMENTS

| | | | |
|---|---|---|---|
| 4,654,634 A | | 3/1987 | Thong et al. |
| 5,374,932 A | * | 12/1994 | Wyschogrod et al. ......... 342/36 |
| 5,469,516 A | * | 11/1995 | Kerz .......................... 382/254 |
| 5,539,667 A | | 7/1996 | Rode |
| 5,553,200 A | | 9/1996 | Accad |
| 5,592,592 A | * | 1/1997 | Shu ............................ 358/1.9 |
| 5,625,755 A | * | 4/1997 | Shu ............................ 358/1.9 |
| 5,684,932 A | * | 11/1997 | Shu ............................ 358/1.9 |
| 5,777,624 A | | 7/1998 | Munson |
| 5,905,820 A | | 5/1999 | Cushman et al. |
| 5,963,201 A | * | 10/1999 | McGreggor et al. ......... 345/722 |

FOREIGN PATENT DOCUMENTS

| | | |
|---|---|---|
| EP | 0775983 | 5/1997 |
| EP | 0947955 | 10/1999 |

OTHER PUBLICATIONS

Abe, "Digital Halftoning With Optimized Dither Array", Dai Nippon Printing Co. Ltd., Tokyo, Japan, IEEE 2001, pp. 517–520.*

Kimmel R et al: " Images as embedding maps and minimal surfaces: a unified approach for image diffusion" Image Processing 1997, Proceedings International Conference on Santa Barbara, CA USA Oct. 26–29, 1997, Los Alamitos, Ca USA IEEE Comput. Soc, US pp. 368–371 XP010253642.

* cited by examiner

*Primary Examiner*—Jayanti K. Patel

(57) ABSTRACT

An array of n-bit words representing an image is filtered to produce a corresponding array of higher precision m-bit words representing the image. During the filtering, upper and lower bounds for the m-bit words are identified, and values for the m-bit words are selected between the upper and lower bounds. There is at least some spatial smoothness between the selected values. For example, the values may be selected at sample points of a curve or surface between the upper and lower bounds.

23 Claims, 6 Drawing Sheets

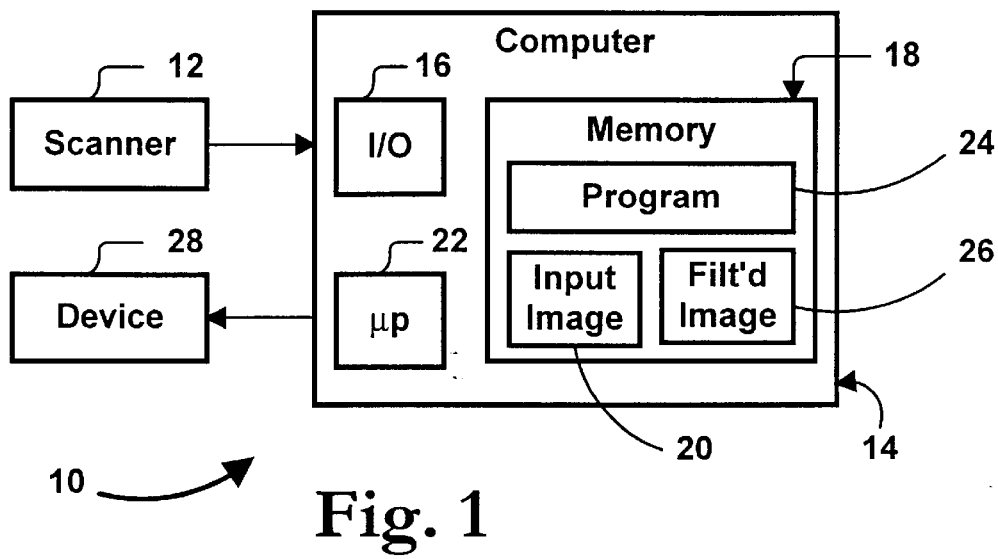
Fig. 1
Fig. 2
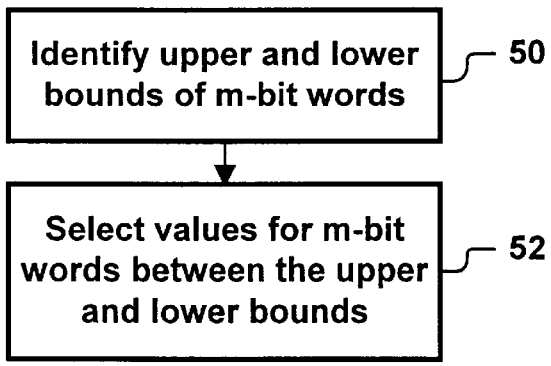
Fig. 3
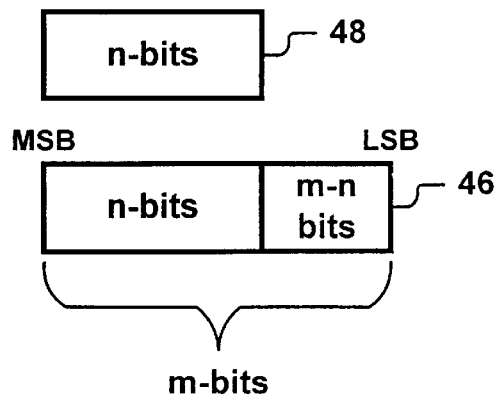

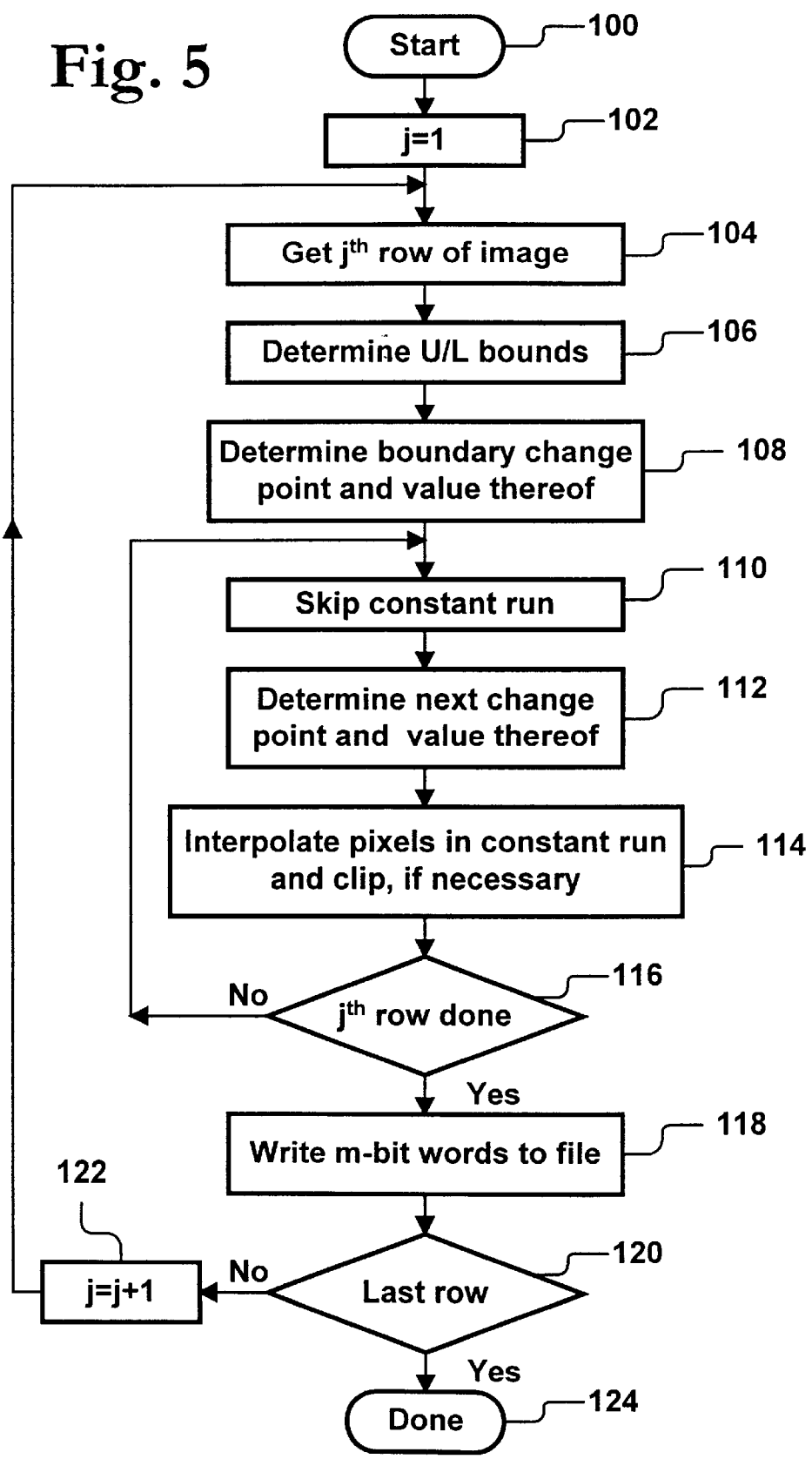

METHOD AND APPARATUS FOR FILTERING IMAGES HAVING INSUFFICIENT TONAL PRECISION

BACKGROUND OF THE INVENTION

The invention relates generally to digital imaging. More specifically, the invention relates to a method and apparatus for attenuating quantization contour artifacts in underquantized image data.

For any number of reasons, a digital image might be undersampled or underquantized. When rendered on a display or printer, an image having a tone scale that is insufficiently quantized is subject to the introduction of quantization contour artifacts. These artifacts can be especially objectionable in image areas having spatially smooth intensity variations such as sky, skin and large homogeneous surfaces such as walls.

The artifacts are essentially amplified quantization errors in the tone scale of the image. If, for instance, a scanner outputs 8-bit words representing an image, and a computer displays 16-bit words, the computer might multiply the 8-bit words by a scale factor of $2^8$ in order to produce the 16-bit words for display. However, a difference of one between two 8-bit words now becomes an abrupt difference of $2^8$. These abrupt differences can cause the quantization contour artifacts to become visible when the image is displayed.

There are various ways of reducing the visibility of the quantization contour artifacts. For example, Gaussian noise can be added to the underquantized image to break up the contour lines. However, the Gaussian noise can also reduce image contrast.

Another source of quantization contour artifacts is tone mapping, whereby the words of the underquantized image are multiplied by a tone-dependent gain. The gain is usually higher at lower tone levels in order to boost dark details to make them visible. Both signal and noise including so-called "quantization noise" are amplified by high gain. Without adequate input precision, high gain tone map regions have skipped output levels that yield abrupt difference quantization artifacts. These abrupt differences are especially visible in smooth shaded areas.

Thus an image which appears well quantized before tone mapping can show itself after mapping to have inadequate tonal precision.

SUMMARY OF THE INVENTION

Quantization contour artifacts are attenuated by augmenting precision using spatial information. According to one aspect of the present invention, an array of n-bit data words is generated, and the n-bit words are filtered to provide corresponding m-bit words. Filtering is performed by identifying upper and lower bounds of each m-bit word; and selecting values for the m-bit words between the upper and lower bounds. There is at least some spatial smoothness between the selected values. The lower bound of a given m-bit word has its n most significant bits equal to the corresponding n-bit word; and the upper bound of a given n-bit word is equal to a sum of a maximum uncertainty and the lower bound of the given m-bit word.

If the array of n-bit data words represents an image, the filtering can reduce the abruptness of changes in values of the m-bit words and, therefore, can attenuate quantization contour artifacts.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is a system including a scanner and a computer according to the present invention;

FIG. 2 is an illustration of a generalized method of filtering a sequence of n-bit words representing an image to produce a sequence of m-bit bit words representing the image, the n-bit words being provided by the scanner, the method being performed by the computer;

FIG. 3 is an illustration of an n-bit word and a corresponding m-bit word;

FIG. 5 is an illustration of a computationally fast method of filtering an underquantized image in accordance with the present invention;

DETAILED DESCRIPTION OF THE INVENTION

Figure 4:
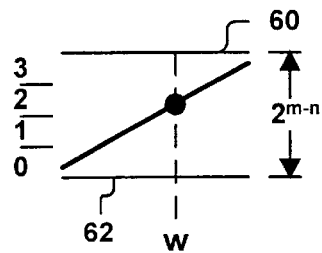
FIG. 4 is an illustration of m−n lower order bits of the m-bit word being filled.

As shown in the drawings for purposes of illustration, the present invention is embodied in a system including a scanner and a computer. The scanner provides an underquantized image to the computer. That is, the image provided to the computer has insufficient tonal precision. If such an image was displayed by the computer, artifacts such as contour lines would be visible. However, the computer can filter the image to attenuate contour lines and other artifacts. Consequently, the artifacts are not as visible when the filtered image is displayed.

FIG. 1 illustrates a system 10 including a scanner 12 and a computer 14. The scanner 12 can scan a continuous image (e.g., a photo) and output n-bit words representing a digitized image. Each n-bit word represents a pixel of the digitized image, where n is a positive integer. For example, the pixels may be represented by eight-bit words (i.e. bytes, where n=8).

The n-bit words are supplied to the computer 14. The computer 14 includes a processor 22, an I/O interface 16 (e.g., a SCSI interface) for receiving the n-bit words from the scanner 12, and computer memory 18 for storing the n-bit words in a file 20. This image file 20 may be stored in short term memory (e.g., RAM) or long term memory (e.g., a hard drive). The short term and long term memory collectively are represented by the computer memory 18.

If the digitized image is underquantized, the microprocessor 22 runs a program 24 to filter the n-bit words to produce larger m-bit words. For example, the computer 14 may filter 8-bit words of an underquantized image to produce 16-bit words. The filtering can attenuate contour lines and other artifacts that arise because of poor quantization. The program 24, which is stored in the computer memory 18, will be described below in greater detail.

The m-bit words of the filtered image are stored in a file 26 in the computer memory 18. The computer 14 may send the filtered image file 26 to another device 28. For example, the filtered image file 26 may be sent to a display device (e.g., a printer, a video monitor), it may be sent to another computer via a network connection, etc.

FIGS. 2 and 3 show a general method of filtering an array of n-bit words. Upper and lower bounds of corresponding m-bit words are identified (block 50). The lower bound of a given m-bit word 46 has its n most significant bits equal to the corresponding n-bit word 48 (see FIG. 3). For example, the lower bound of the m-bit word may be equal to the n-bit word shifted left by m−n bits. The upper bound of a given m-bit word is equal to a sum of a maximum uncertainty and the lower bound of the given m-bit word. The uncertainty of the lower order m−n bits is divided into $2^{m-n}$ subintervals $[0:2^{m-n}-1]$. The maximum uncertainty is equal to $2^{m-n}-1$.

Values for the m-bit words are selected between the upper and lower bounds (block 52). There is at least some spatial smoothness between the values that are selected. In this manner, the low order m−n bits are filled. The value v of the lower order m−n bits of each m-bit word is within the range $0 \leq v < 2^{m-n}$. Filling the lower order m−n bits with a set of values that are spatially smooth reduces the visibility of contour lines and other quantization artifacts.

Moreover, since the most significant n bits of each m-bit word are equal to the n-bits of the corresponding n-bit word, the original quantization is maintained. That is, quantizing the m-bit words back to n-bits would produce the original sequence of n-bit words By maintaining the original quantization, original information is preserved.

The filling of the lower order bits of an m-bit word is illustrated in FIG. 4 for m−n=2. The quantization uncertainty comprises the subintervals 0, 1, 2 and 3. The intersection of the sample point w and the curve is in subinterval 2.

Figure 9:
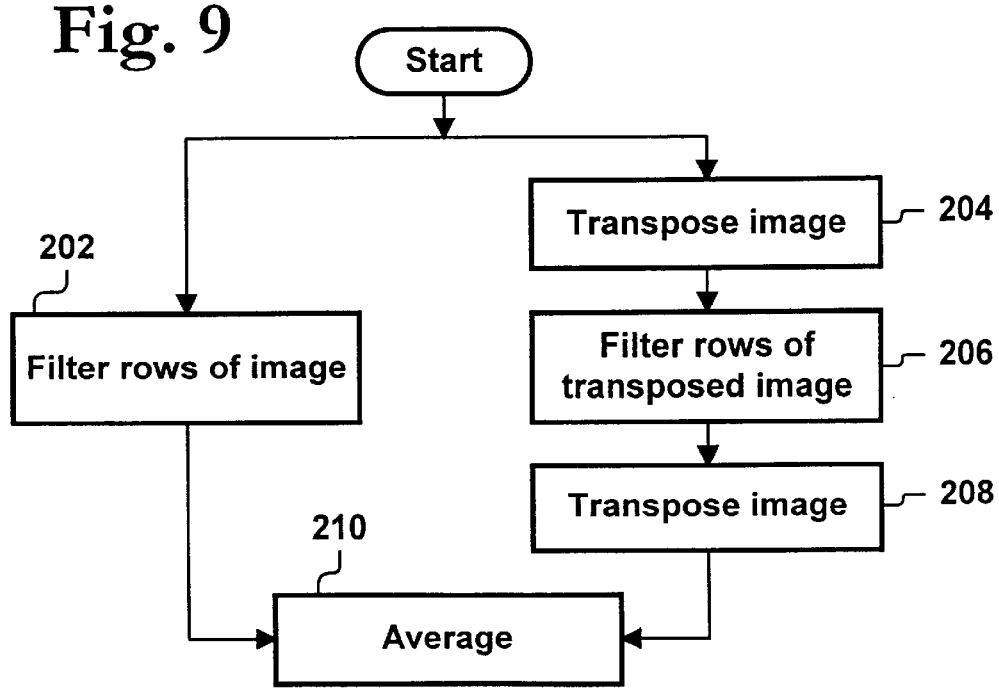
FIG. 9 is an illustration of a method of filtering an underquantized image in two directions.
Figure 10:
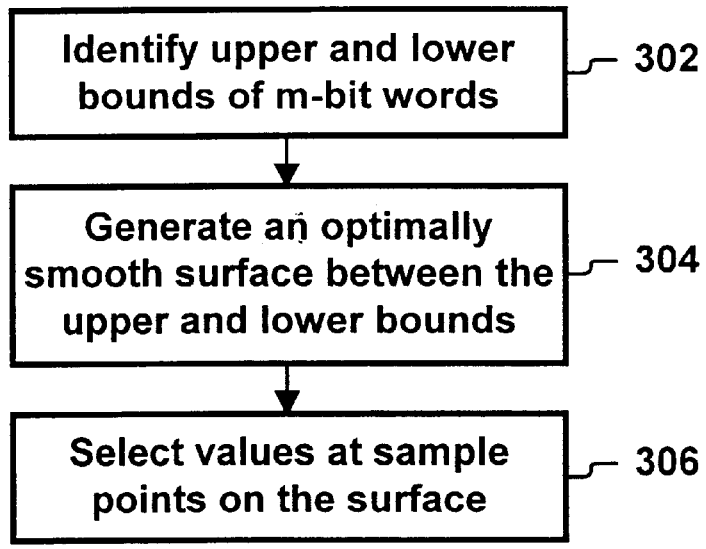
FIG. 10 is an illustration of second method of filtering an underquantized image in two directions.
Figure 11:
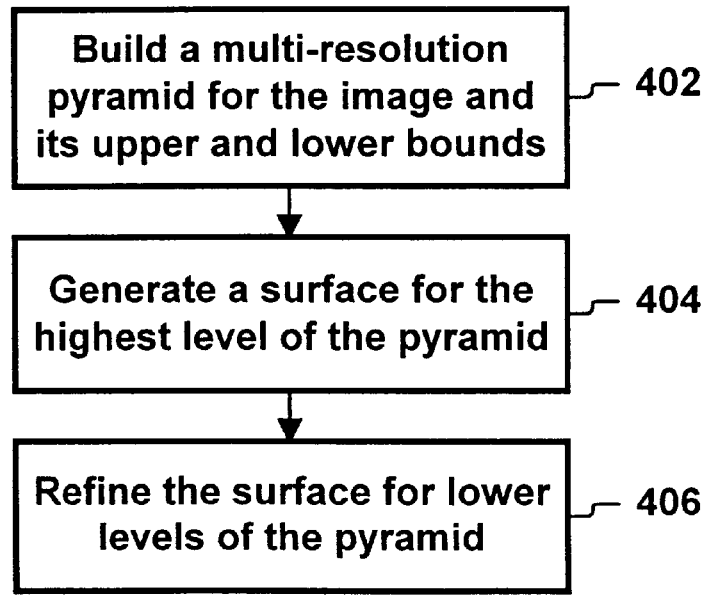
FIG. 11 is an illustration of a third method of filtering an underquantized image in two directions.

There are various methods for generating the spatially smooth curves. A computationally fast method is shown in FIGS. 5 to 9. A computationally intensive method that yields an optimally smooth surface is shown in FIG. 10. A faster variation of this computationally fast method is shown in FIG. 11. Any of these methods may be performed by the microprocessor 22 during execution of the filter program 24.

Figure 6:
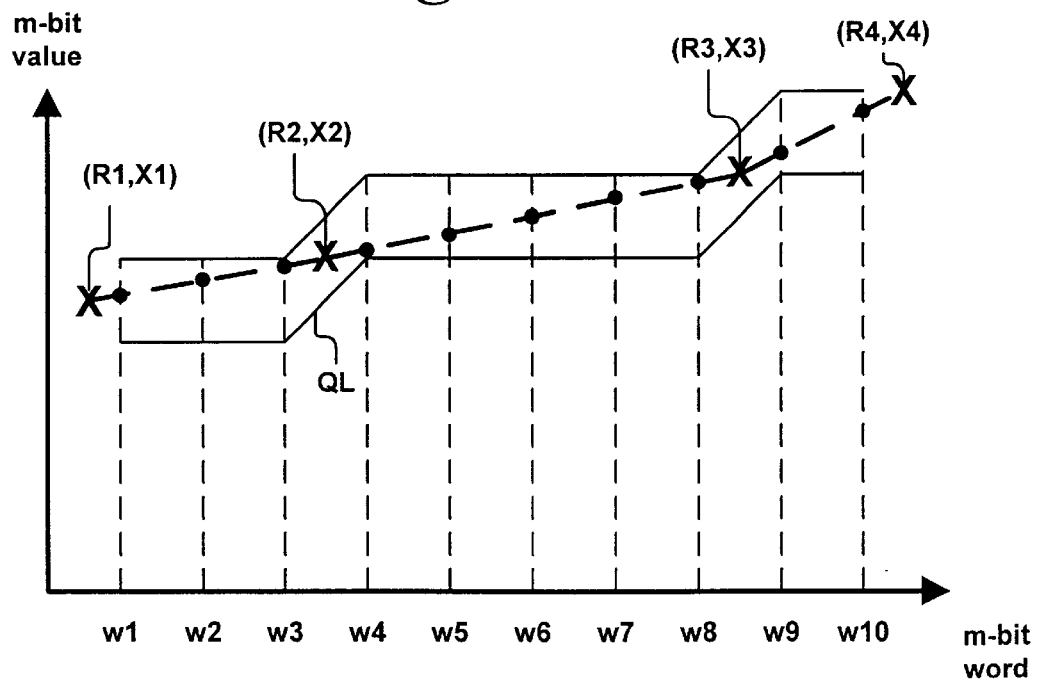
FIG. 6 is an illustration of a first n-bit word sequence that is filtered in accordance with the method of FIG. 5.

Reference is now made to FIGS. 5 and 6. At the start of the filtering (block 100), a first row of underquantized n-bit words is accessed (blocks 102 and 104). Upper and lower bounds of corresponding m-bit words are then determined (block 106). The lower bound of each m-bit word may be determined by packing its most significant n-bits with the corresponding n-bit word or by appending an additional m−n bits to the n-bit word. The lower order m−n bits of the resulting m-bit word may be set to zero.

The lower order m−n bits of the m-bit words are then filled in. An initial change point is determined (block 108). For example, the initial change point X1 may be an imaginary point to the left of the first m-bit word w1. The value R1 of the initial change point X1 may be equal to a value between the upper and lower bounds of the first m-bit word w1.

A constant run of m-bit words w1 to w3 is skipped (block 110) until a second change point X2 is identified (block 112).

A constant run refers to consecutive m-bit words having the same lower bound. The second change point X2 is identified as an imaginary point between consecutive m-bit words having different lower bounds (block 110). Thus, the second change point X2 lies between third and fourth m-bit words w3 and w4.

A value R2 for the second change point X2 is then determined. Graphically, this value R2 may be at the geometric center of a quadrilateral QL connecting the upper and lower bounds of the third and fourth m-bit words w3 and w4. Thus, the value R2 may be found at the intersection of the quadrilateral's two diagonals.

Next, the values of the first to third m-bits words w1 to w3 (that is, the words in the constant run) are interpolated (block 114). If a linear interpolation is used, a value Δ may be computed, where $$\Delta = (R2-R1)/d_{X2-X1}.$$

The quantity $d_{X2-X1}$ represents the distance between the initial and second change points X1 and X2. The distance may be expressed as a number of words. Thus, the first m-bit word w1 may have a value of R1+Δ/2, the second m-bit word may have a value of R1+3Δ/2, and the third m-bit word w2 may have a value of R1+5Δ/2. Interpolated values are indicated by the dark circles.

The interpolated values are clipped if necessary. Clipping is performed so that the interpolated m-bit values, if scaled back by m−n bits, retain their original n-bit values. Clipping is not performed in the example shown in FIG. 6. However, examples of clipping are given in FIGS. 7 and 8, which will be described below.

If all of the n-bit words in the row have not been filtered (block 116), the next constant run of m-bit words is skipped (block 110) until a third change point X3 has been identified (block 112). Values for the m-bit words w4 to w8 are interpolated between the second and third change points R2 and R3 (block 114). In analogy with the initial change point of a row, a value R4 for the final change point is an imaginary one to the right of the final sample X4.

After values for all of the m-bit words in the row have been determined (block 116), the row of m-bit words is written to the filtered image file 26 (block 118), and the next row of n-bit words is accessed (blocks 120, 122 and 104) and filtered (blocks 106 to 116). After all of the rows have been filtered (block 120), the filtering is finished and the filtered image file 26 is closed (block 124).

According to a graphical interpretation of the filtering, the interpolated values of the m-bit words are allowed to vary within a tunnel defined by the upper and lower bounds of the m-bit words. The width of the tunnel is equal to the quantization uncertainty of $2^{m-n}-1$ counts on the m bit scale. As can be seen from FIG. 5, the values of the interpolated words w1 to w3 and w4 to w8 increase incrementally. By avoiding abrupt changes in values of the m-bit words, visibility of contours lines and other artifacts is reduced.

Figure 7:
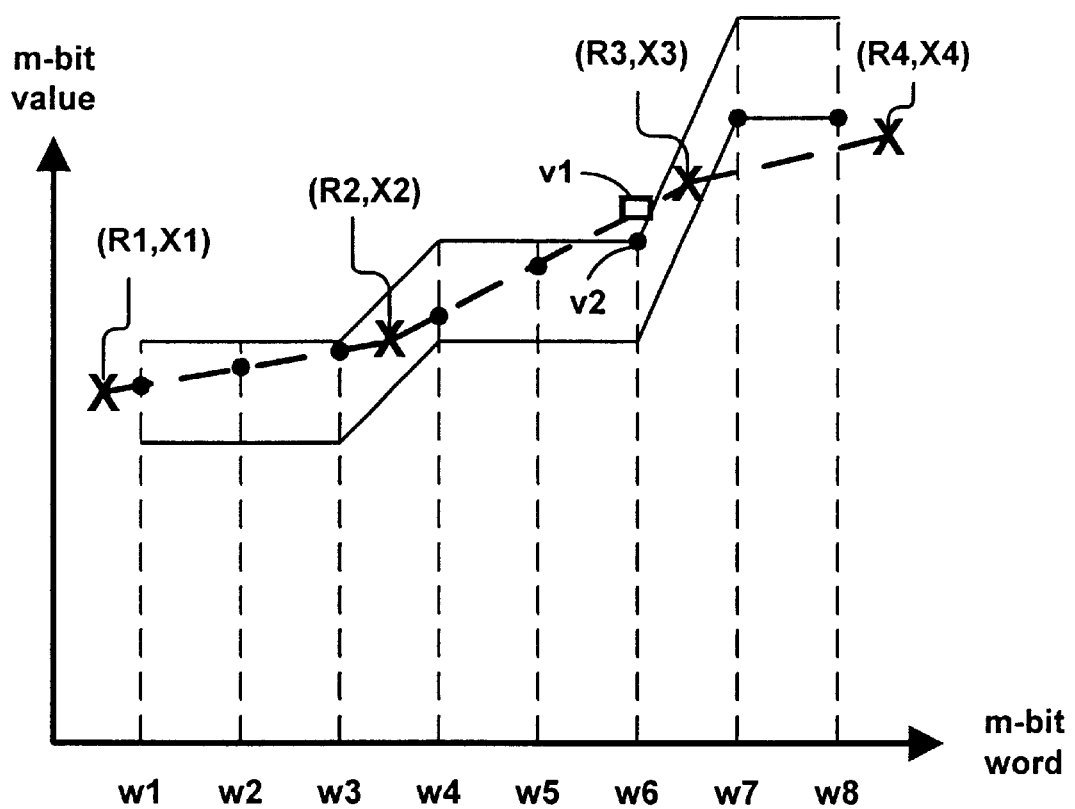
FIG. 7 is an illustration of a second n-bit word sequence that is filtered in accordance with the method of FIG. 5, the filtering of the second sequence including clipping operations.

Reference is now made to FIG. 7, which illustrates a clipping operation. Values R1 and R2 for first and second change points X1 and X2 are determined, and values for first to third words w1 to w3 are interpolated. All three values lie within the upper and lower bounds; therefore, clipping is not performed.

A value R3 for a third change point X3 is determined, and values for fourth to sixth words w4 to w6 are interpolated between the second and third change point values R2 and R3. The interpolated value of the sixth word w6 lies above the upper limit of the tunnel, as indicated by the rectangle v1. If the interpolated value of the sixth word w6 was not clipped and thereafter quantized back to n bits, the original value of the requantized sixth word w6 would not be preserved. Therefore, the sixth m-bit word w6 is clipped at its upper bound. That is, the value of the sixth word w6 is set equal to its upper bound. The value of the sixth word w6 is indicated by a dark circle v2.

A fourth value R4 for a fourth change point X4, as indicated in FIG. 7, causes seventh and eight words w7 and w8 to be clipped at their lower bounds.

Figure 8:
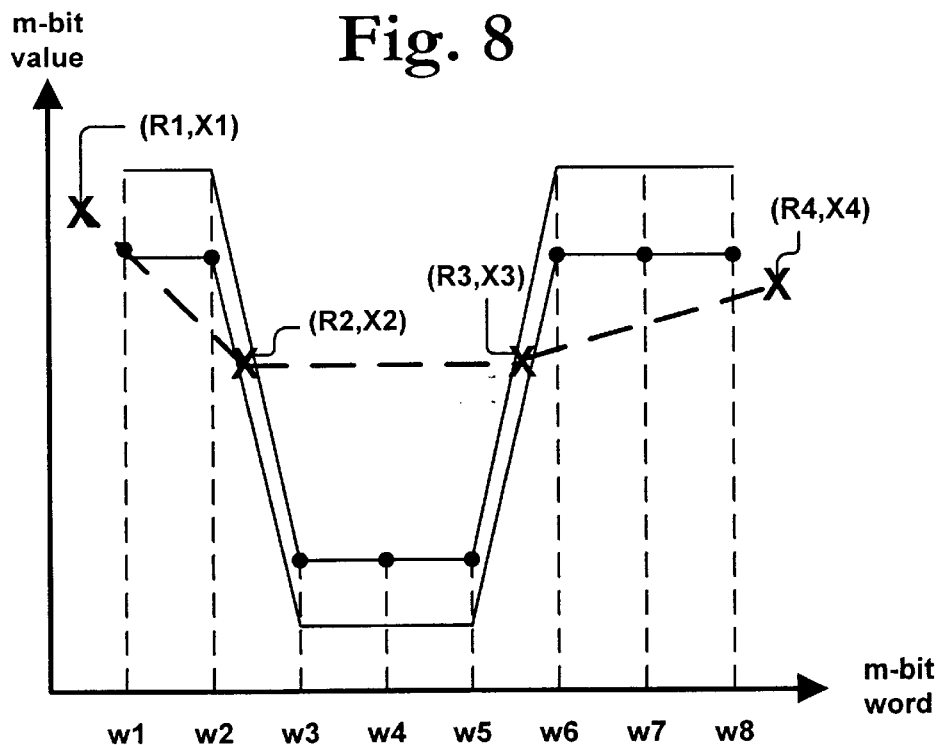
FIG. 8 is an illustration of a third n-bit word sequence that is filtered in accordance with the method of FIG. 5, the filtering of the third sequence including clipping operations.

FIG. 8 illustrates the effect of a clipping operation on a dark region between two light regions. The first light region is represented by first and second words w1 and w2, and the second light region is represented by sixth, seventh and eighth words w6, w7 and w8. The dark region is represented by third, fourth and fifth words w3, w4 and w5.

Values R1, R2, R3 and R4 for four change points X1, X2, X3 and X4 are determined. An interpolated value for the first word w1 lies within the tunnel. The value of the second word w2 is clipped at the lower bound of the second word, the values for the third, fourth and fifth words w3, w4 and w5 are clipped at their upper bounds, and the values of the sixth, seventh and eight words w6, w7 and w8 are clipped at their lower bounds. Thus, the clipping operations preserve the contrast between the light and dark regions. The contrast between the light and dark regions is the minimum admissible.

The linear filtering described above is performed in a single direction (e.g., a horizontal direction). FIG. 9 shows a method of filtering the underquantized image file 20 in horizontal and vertical directions. All rows of the underquantized image file 20 are filtered by performing the method shown in FIG. 5 (block 202). Resulting is a horizontally filtered file. The rows and columns of the underquantized image file are then transposed (block 204) and filtered by once again performing the method shown in FIG. 5 (block 206). Resulting is a vertically filtered file. The rows and columns of the vertically filtered file are then transposed (block 208) and averaged together with the horizontally filtered file, keeping the appropriate registration between pixels, to produce the filtered image file (block 210)

Reference is now made to FIG. 10, which shows a method of filtering the underquantized image file 20 in a single pass. The single-pass filtering is performed by identifying upper and lower bounds of each m-bit word (block 302); generating an optimally smooth surface between the upper and lower bounds of each of the m-bit words (block 304); and selecting values of the m-bit words at sample points on the optimally smooth surface (block 306).

According to a graphical interpretation of the single-pass filtering, the optimally smooth surface is allowed to vary between a ceiling and a floor. The ceiling is defined by the upper bounds of the m-bit words, and the floor is defined by the lower bounds of the m-bit words. The distance between the floor and the ceiling is equal to the maximum uncertainty.

Points $I(x,y)$ on the optimally smooth surface may be determined by solving $$\min \int\int |\nabla I(x,y)|^2 dx\, dy$$

subject to $LB(x,y) \leq I(x,y) \leq UB(x,y)$, where $LB(x,y)$ is the lower bound at coordinates x and y, UB is the upper bound at coordinates x and y, and $\nabla$ represents a gradient.

The integral may be solved by minimizing the gradient magnitude at every point iteratively by applying Laplacian operators. For example, the points. $I(x,y)$ may be determined by $$I^{n+1} = I^n + \Delta t(I_{xx} + I_{yy})$$

where $\Delta t \leq 0.25$ and $I_{xx} + I_{yy}$ are estimates of the Laplacians that operate on the points $I(x,y)$. The number of iterations and smoothness of the surface is inversely proportional to the width of the stripe formed due to quantization between two contours.

Reference is now made to FIG. 11. To reduce computational time, the optimally smooth surface may be generated by building a multi-resolution pyramid of the unfiltered image 20 and its corresponding upper and lower bounds (block 402); generating a rough surface at the highest level of the multi-resolution pyramid (block 404) and refining the surface at each lower level (block 406).

During construction of the pyramid, the unfiltered j×k image 20 forms the lowest level. It is subsampled to produce a j/2×k/2 image at the next higher level. The j/2×k/2 image is then subsampled to produce a j/4×k/4 image, and so on until the subsampling produces the coarsest non-unitary image (e.g., a 2×2 image) at the highest level. Subsampling may be performed by averaging together four pixels in an $n^{th}$ level of the pyramid to form a pixel in the $n+1^{th}$ level. Odd rows and columns may be saved to allow for handling of non-square images (that is, where j≠k).

The surface generated for the highest level of the multi-resolution pyramid can be computed by solving for the integral above. Then, the surface for the highest level is increased in size (for example, by pixel replication or linear interpolation) and refined in the next highest level, with the upper and lower bounds at the next lower level serving as constraints. The surface is further refined at each subsequent lower level until a j×k image is produced at the lowest level.

Thus disclosed is an invention that filters n-bit image data to produce higher precision m-bit image data. The higher precision words are constrained to have the same high order bits as the lower precision words. Lower order bits are added to attenuate contour lines and other artifacts attributed to underquantization of the n-bit image data. A simple algorithm using linear interpolation and clipping can be performed quickly. A more computationally intensive algorithm using an optimally smooth surface will usually achieve a smoother result at the expense of greater computation.

The invention is not limited to the specific embodiments described above. For example, the tunnels may be smoothed by filtering the upper and lower bounds prior to the selection of the values of the m-bit words.

Values of the change points are not limited to the geometric centers of the change regions. For example, change point values may be at the upper or lower bounds. However such values might increase the chances of the interpolated values being clipped.

The invention is not limited to underquantized images provided by a scanner. Images may be provided by other digital image capture devices such as digital cameras.

The invention is not limited to the filtering of underquantized image data. Any type of data can be filtered. For example, underquantized acoustic data could be filtered in accordance with the present invention.

Therefore, the invention is not limited to the specific embodiments described and illustrated above. Instead, the invention is construed according to the claims that follow.

What is claimed is:

1. A method of filtering a signal representing an array of n-bit words to produce a signal representing a corresponding array of m-bit words, where m and n are integers and m>n, the method comprising:

identifying upper and lower bounds of each m-bit word; and selecting values for the m-bit words between the upper and lower bounds, there being at least some spatial smoothness between the selected values;

the lower bound of a given m-bit word having its n most significant bits equal to the corresponding n-bit word;

the upper bound of a given n-bit word being equal to a sum of a maximum uncertainty and the lower bound of the given m-bit word.

2. The method of claim 1, wherein the values are selected by generating a sequence of curves within the upper and lower bounds of the m-bit words; and selecting values for the m-bit words at sample points on the curves.

3. The method of claim 1, wherein the lower bound of a given m-bit word equals a product of $2^{m-n}$ and the value of the corresponding n-bit word; and wherein each quantization uncertainty has $2^{m-n}$ subintervals and a maximum uncertainty of $2^{m-n}-1$.

4. The method of claim 1, wherein the values of a plurality of m-bit words are selected by identifying a first change point in the array;

skipping a constant run of lower bounds following the first change point;

identifying a second change point at the end of the constant run; and interpolating values for the m-bit words in the constant run, the values of the plurality of m-bit words being interpolated between the first and second change points.

5. The method of claim 4, wherein each change point is identified by finding first and second consecutive lower bounds having different values; and wherein a change point value is computed as a geometric center of a change region between the first and second consecutive lower bounds.

6. The method of claim 4, wherein the interpolation is linear.

7. The method of claim 4, further comprising the step of clipping interpolated values that are outside corresponding lower and upper bounds.

8. The method of claim 4, further comprising:

accessing n-bit image data;

processing each row of image data by identifying first and second change points between constant runs of n-bit words, and interpolating the m-bit words in the constant runs;

transposing the image data;

processing each row of transposed image data by identifying first and second change points between constant runs of n-bit words, and interpolating the m-bit words in the constant runs;

re-transposing the processed image data; and taking an average of the m-bit words obtained by re-transposing the processed transposed image data and the non-transposed image data, while keeping registration between the two sets of filtered data.

9. The method of claim 1, wherein the values of the m-bit words are selected by generating an optimally smooth surface within upper and lower bounds of the m-bit words; and selecting values of the m-bit words at sample points on the optimally smooth surface.

10. The method of claim 9, wherein the optimally smooth surface is generated by solving for $$\min \int\int |\nabla I(x,y)|^2 dx\, dy$$

subject to $LB(x,y) \leq I(x,y) \leq UB(x,y)$, where $I(x,y)$ is a selected value at coordinates x and y, $LB(x,y)$ is the lower bound at coordinates x and y, UB is the upper bound at coordinates x and y, and $\nabla$ represents a gradient.

11. The method of claim 9, wherein a multi-resolution pyramid of the m-bit words and the upper and lower bounds is generated; wherein a surface is generated for a highest level of the pyramid; and wherein the surface is refined for lower levels of the pyramid.

12. A method of filtering a signal representing a sequence of n-bit words to produce a signal representing a corresponding array of m-bit words, where m and n are integers and m>n, the method comprising:

identifying upper and lower bounds of the m-bit words in the sequence;

identifying a first change point in the sequence;

skipping a constant run of lower bounds following the first change point;

identifying a second change point at the end of the constant run;

interpolating values for the m-bit words in the constant run, the values of the m-bit words being interpolated between the first and second change points; and clipping any values that fall outside of the upper or lower bounds.

13. A method of filtering a signal representing a two-dimensional array of n-bit words to produce a signal representing a corresponding two-dimensional array of m-bit words, where m and n are integers and m>n, the method comprising the steps of:

identifying upper and lower bounds of each m-bit word;

generating an optimally smooth surface between the upper and lower bounds of the m-bit words; and selecting values of the m-bit words at sample points on the surface;

the lower bound of a given m-bit word having its n most significant bits equal to the corresponding n-bit word;

the upper bound of a given n-bit word being equal to a sum of a maximum uncertainty and the lower bound of the given m-bit word.

14. The method of claim 13, wherein a multi-resolution pyramid of the m-bit words and the upper and lower bounds is generated;

wherein a surface is generated for a highest level of the pyramid; and wherein the surface is refined for lower levels of the pyramid.

15. A data system comprising:

means for generating a plurality of n-bit data words; and means for filtering the plurality of n-bit words to produce corresponding m-bit words, the filtering being performed by identifying upper and lower bounds of the m-bit words; and selecting values of the m-bit words between the upper and lower bounds, there being at least some spatial smoothness between the selected values, the lower bound of a given m-bit word having its n most significant bits equal to the corresponding n-bit word, the upper bound of a given n-bit word being equal to a sum of a maximum uncertainty and the lower bound of the given m-bit word.

16. Apparatus for filtering a plurality of n-bit words to produce a plurality of corresponding m-bit words, the apparatus comprising:

a processor; and computer memory encoded with a program that, when executed, instructs the processor to identify upper and lower bounds of each m-bit word; and select m-bit word values between the upper and lower bounds, there being at least some spatial smoothness between the selected values, the lower bound of a given m-bit word having its n most significant bits equal to the corresponding n-bit word, the upper bound of a given n-bit word being equal to a sum of a maximum uncertainty and the lower bound of the given m-bit word.

17. The apparatus of claim 16, wherein the values are selected by generating a sequence of curves within the upper and lower bounds of the m-bit words; and selecting values of the m-bit words at sample points on the curves.

18. The apparatus of claim 17, wherein the values of a plurality of m-bit words are selected by identifying a first change point in the sequence;

skipping a constant run of lower bounds following the first change point;

identifying a second change point at the end of the constant run; and interpolating values for the m-bit words in the constant run, the values of the plurality of m-bit words being interpolated between the first and second change points.

19. The apparatus of claim 18, further comprising the step of clipping interpolated values that are outside a lower bound or upper bound.

20. The apparatus of claim 16, wherein the values of the m-bit words are selected by generating an optimally smooth surface within upper and lower bounds of each m-bit word; and selecting values of the m-bit words at sample points on the optimally smooth surface.

21. The apparatus of claim 20, wherein the optimally smooth surface is generated by solving for $$\min \int\int |\nabla I(x,y)|^2 dx\, dy$$

subject to $LB(x,y) \leq I(x,y) \leq UB(x,y)$, where $I(x,y)$ is a point on the curve at x and y, $LB(x,y)$ is the lower bound at x and y, UB is the upper bound at x and y, and $\nabla$ represents a gradient.

22. The apparatus of claim 20, wherein a multi-resolution pyramid of the m-bit words and the upper and lower bounds is generated; wherein a surface is generated for a highest level of the pyramid; and wherein the surface is refined for lower levels of the pyramid.

23. An article of manufacture for a processor of an image filter, the article comprising:

computer memory; and a program encoded in the computer memory, the program, when executed, instructing the processor to identify upper and lower bounds of each m-bit word in an array; and select values of the m-bit words between the upper and lower bounds, there being at least some spatial smoothness between the selected values, the lower bound of a given m-bit word having its n most significant bits equal to the corresponding n-bit word, the upper bound of a given n-bit word being equal to a sum of a maximum uncertainty and the lower bound of the given m-bit word.

\* \* \* \* \*